S. ARNOLD, W. L. CHASE & H. M. ARNOLD.
Axles for Vehicles.
No. 153,034. Patented July 14, 1874.
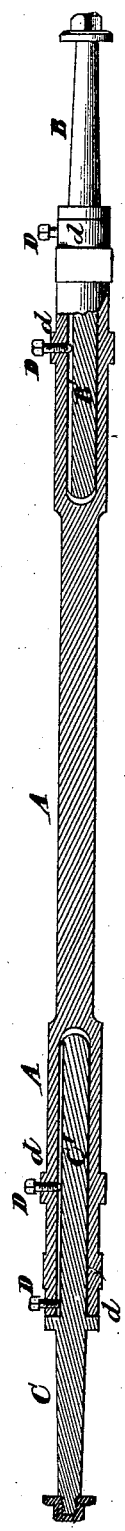
Witnesses.
A. Ruppert.
Henry A. Kendall
Inventors:
Seth Arnold
Wm L. Chase
Henry M. Arnold
By Somes & Co.
Attys

UNITED STATES PATENT OFFICE.

SETH ARNOLD AND WILLIAM L. CHASE, OF WOONSOCKET, AND HENRY M. ARNOLD, OF PAWTUCKET, RHODE ISLAND.

IMPROVEMENT IN AXLES FOR VEHICLES.

Specification forming part of Letters Patent No. 153,034, dated July 14, 1874; application filed June 2, 1874.

*To all whom it may concern:*

Be it known that we, SETH ARNOLD and WILLIAM L. CHASE, of Woonsocket, Providence Plantations, and HENRY M. ARNOLD, of Pawtucket, and in the State of Rhode Island, have invented a new and useful Extension-Axle for Wheeled Vehicles; and we do hereby declare that the following is a full, clear, and exact description thereof, reference being had to the annexed drawings, which represent an axial section of the preferred form of our extensible axle.

Our invention is more especially intended to meet the wants of traveling merchants, showmen, and all whose business calls them to travel different sections of the country with wheeled vehicles, and who find it would be an important advantage if the trucks of their vehicles could be readily changed from one gage to another. Our improvement consists in making the axles of vehicles for common roadways in several sections, suitably connected together, so that they may be readily lengthened or shortened to adjust the wheels or trucks to any desired gage.

To enable those skilled in the art to make and use our invention, we will proceed to describe its construction and operation.

The axle illustrated is made of iron, in three sections, namely, the main shaft A, and the journals B and C. A long socket is formed in either end of the part A, to receive, respectively, the shanks B' and C' of the journals B and C, which are then clamped or secured by set-screws D passing through taps in collars *a* formed on the part A.

On unscrewing the set-screws the journals may be adjusted in and out, to shorten or lengthen the axle, to obtain any desired gage for the trucks.

The above-described form is but one of many in which our invention can be embodied; and though, for several reasons, we consider this the preferable form for iron axles, we desire it to be distinctly understood that our claim of invention is not restricted to this particular form. Thus, instead of connecting the parts by socket-joints, they may be united together by lap-joints; and, instead of making the axle in three pieces, it may consist of only two, adjustably connected together midway between the journals.

Of course our invention is just as applicable to wooden axles as it is to metallic ones.

The sockets may be formed in the journal-sections of the axle, if found desirable, the central shaft forming the male section thereof.

What we claim as our invention, and desire to secure by Letters Patent, is—

1. An extensible axle for common road wheeled vehicles, made in sections endwise adjustable, substantially as set forth.

2. An extensible axle for wheeled vehicles, composed of a main shaft, A, with longitudinal sockets, in combination with journals B and C, with shanks B' C', adjustable within said sockets, substantially as set forth.

3. The combination of the socketed main shaft A, journals B and C, with shanks B' C' and set-screws D, as set forth.

4. In an extensible axle composed of sections held together in socket joints, bands or collars surrounding the socketed portion of said axle, substantially as and for the purpose set forth.

SETH ARNOLD.
WM. L. CHASE.
HENRY M. ARNOLD.

Witnesses:
ALFRED ALLEN,
GEORGE CHATTERTON, Jr.